Oct. 15, 1929.  F. R. FRIEND  1,731,717
STRIPPER BRUSH FOR COTTON PICKER MACHINES
Filed Sept. 19, 1928  2 Sheets-Sheet 1
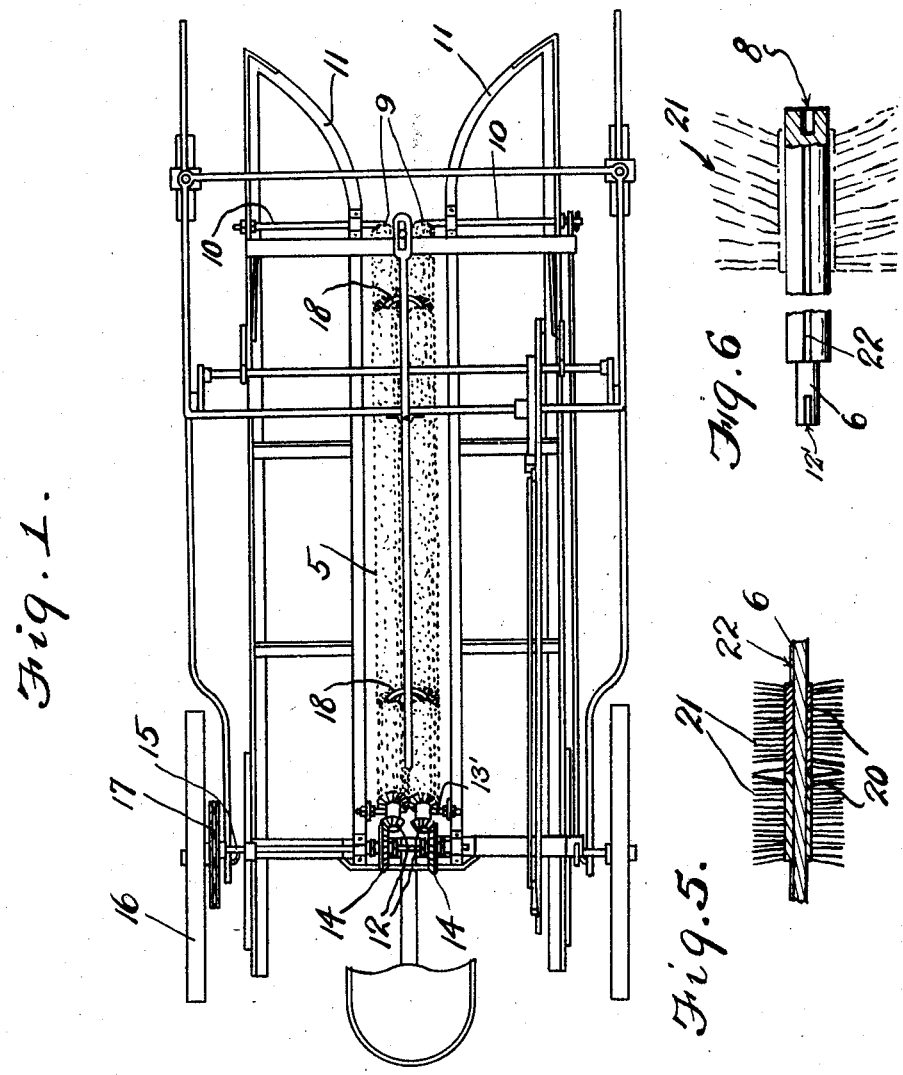
Inventor
Floyd R. Friend
By Clarence A. O'Brien
Attorney Oct. 15, 1929.　　　　F. R. FRIEND　　　　1,731,717
STRIPPER BRUSH FOR COTTON PICKER MACHINES
Filed Sept. 19, 1928　　2 Sheets-Sheet 2
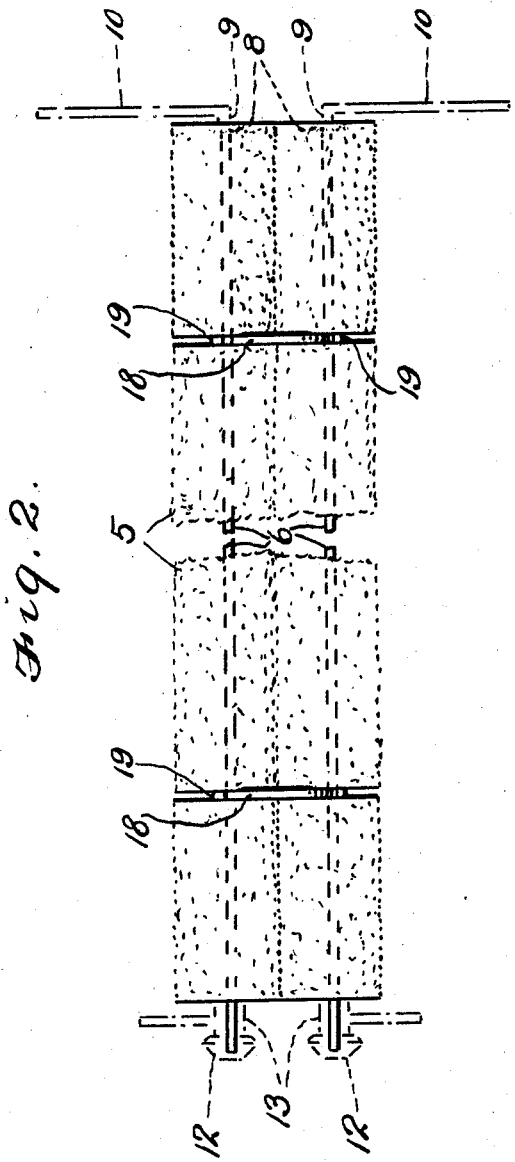
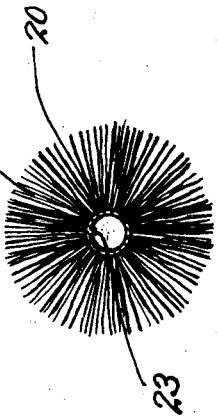
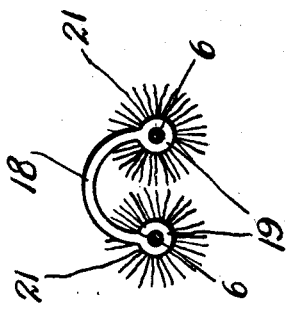
Inventor
*Floyd R. Friend*
By *Clarence A. O'Brien*
Attorney Patented Oct. 15, 1929

1,731,717

UNITED STATES PATENT OFFICE

FLOYD R. FRIEND, OF LUBBOCK, TEXAS

STRIPPER BRUSH FOR COTTON-PICKER MACHINES

Application filed September 19, 1928. Serial No. 307,005.

The present invention relates to cotton picking machines and more particularly to machines having rotatable brushes mounted in position thereon for engagement with the cotton, as the machine passes over the same whereby to effect a removal of the mature cotton from the plant and deposit the same in a suitable receptacle carried by the machine.

The invention has for an important object to provide a pair of rotating brushes for the machine adapted to remove the mature cotton from the plant without injuring or effecting the leaves or unripened cotton bolls of the plant and thus eliminate a large quantity of the foreign matter from the cotton which is usually stripped from the cotton plant during the picking operation in machines now in use.

Another object is to arrange the picker brushes in pairs so that the cotton plants may pass between the same and also to rotatably mount the brushes and operatively connect the same with the wheels of the machine so as to more efficiently accomplish the picking action.

A still further important object is to provide bridge members extending between the brush shafts and disposed in the path of the cotton plant for engaging the same and forcing the plant into position for engagement with the brushes and into a new stripping position so that all the parts of the plant will be engaged by the brushes as the machine passes thereover.

Other objects and advantages of this invention will become more apparent as the description proceeds.

In the drawings:

Figure 1 is a top plan view of a cotton picking machine showing the pair of picker brushes mounted in operative position thereon, Figure 2 is a plan view of the pair of brushes, Figure 3 is a transverse sectional view thereof illustrating the bridge members connecting the brush shafts, Figure 4 is a transverse sectional view through one of the brushes, Figure 5 is a longitudinal sectional view of a brush member formed of individual sections, and Figure 6 is a fragmentary side elevational view of the forward end of the brush shaft and illustrating the manner in which the same is mounted at the forward end of the machine.

Referring now to the drawings in detail, for the purpose of illustration, I have disclosed my invention mounted in operative position upon a suitable type of cotton picking machine, such as described in detail in my co-pending application, Serial No. 220,253, although it is to be understood that the picker brushes, constituting the present invention, may be operatively mounted in picking position upon other types of cotton picking machines.

The present invention comprises a pair of picking brushes indicated generally at 5, each of said brushes being supported on a pair of parallel shafts 6 extending longitudinally of the machine and preferably inclined upwardly and rearwardly. The shafts 6 are provided with a recess 8 at their forward ends adapted for receiving the rearwardly extending end 9 of an L-shaped brush supporting member 10 mounted at opposite sides of the frame 11 of the picking machine, at the forward end thereof.

The recess 8 thus forms a bearing for rotatably supporting the forward ends of the shafts. To the rear ends of each of the shafts 6 is secured a bevel gear 12, keyed at the slotted end 12' of the shaft. A sleeve 13 extending forwardly of the gear and fitted upon the rear ends of the shaft is provided with an adjusting bolt 13' for securing the rear end of the shaft to the machine.

In the present form of the invention the gears 12 are driven through gears 14 rotatably mounted on a shaft 15 at the rear end of the frame 11 and operatively connected with the wheels 16 of the machine by means of a chain and sprocket drive 17.

At spaced intervals along the shaft 6 is arranged a plurality of bridge members 18 preferably constructed of bar material with eyes 19 formed at each end through which the shafts 6 are inserted for free rotary movement. The intermediate sections of the bridge members 18 are of an arch shaped formation as clearly illustrated in Figure 3 of the drawings and extend upwardly with respect to the brushes and transversely over the abutting edges thereof.

In the operation of the device the machine is driven over the field of cotton in any suitable manner so that the cotton plants are fed between the brushes 5 at the forward ends thereof. The shafts 6 are operatively connected with the drive mechanism of the machine to rotate the brushes in opposite directions and upwardly and outwardly with respect to each other.

Accordingly as the cotton plants are engaged by the brushes the mature cotton will be stripped therefrom and deposited toward opposite sides of the machine by the respective brushes.

As the plants come into contact with the bridge members 18 the same are bent forwardly and downwardly so that the brushes will remain in contact with the plant for a relatively longer period of time than would ordinarily be possible. As the plants pass beyond and under each of the bridge members the same will then occupy a different position with respect to the brushes so that all portions of the plant will be brought into stripping engagement by the brushes. In this manner the plants are efficiently and thoroughly stripped of the mature cotton.

It will be readily observed that the bristles from which the brushes are formed are sufficiently flexible to permit the cotton bolls and leaves of the plant to pass between the brushes without being removed therefrom.

The brushes 5 are preferably constructed of a plurality of sections as illustrated in Figure 5 of the drawing, each of said sections including a cylindrical hub member 20 to which the bristles 21 are suitably attached in a manner well known in the art.

The hubs 20 are then arranged in end to end relation upon each of the shafts 6. The hubs 20 may be secured to the shaft in any suitable manner as for instance by forming a groove 22 longitudinally in the shafts and forming ribs 23 within each brush section for insertion in the groove and thus cause the rotation of the brushes with the shafts.

It will be further observed that the bridge member 18 serves to retain the shaft 6 in uniform parallel relation throughout the length of the brushes. Also, if desired, the bridge members may have their ends attached to the frame 11 of the machine or extend entirely over both brushes in spaced relation therefrom.

While I have shown the preferred embodiment of my invention, it is obvious that various changes in size, shape and arrangement of parts may be resorted to without departing from the spirit or sacrificing any of the advantages of the appended claims.

What I claim as new is:

1. A stripper for cotton picking machines comprising a pair of brushes rotatably mounted on the machine, shafts axially disposed with respect to the brushes and means arranged at spaced intervals along said shafts whereby to maintain the same in uniform spaced relation.

2. A stripper for cotton picking machines comprising a pair of longitudinally extending shafts mounted for rotation on the machine, a plurality of brush sections carried by the shafts for rotation therewith and bridge members between the shafts and arched above the horizontal plane of the brushes.

3. A stripper for cotton picking machines comprising a pair of longitudinally extending shafts mounted for rotation on the machine and having grooves formed longitudinally therein, a plurality of brush sections, each including a tubular hub having a rib formed therein adapted to fit in said groove, and means connecting each of said shafts intermediate their ends whereby to retain the same in uniformly spaced relation, said means extending transversely above the adjacent edges of the brushes for bending the cotton plants toward the brushes upon engagement therewith.

In testimony whereof I affix my signature.

FLOYD R. FRIEND.